United States Patent [19]
Hemker et al.

[11] Patent Number: 4,884,993
[45] Date of Patent: Dec. 5, 1989

[54] HARVESTER THRESHER

[75] Inventors: Heinrich Hemker; Franz Heidjann, both of Harsewinkel, Fed. Rep. of Germany

[73] Assignee: Claas Ohg, Harsewinkel, Fed. Rep. of Germany

[21] Appl. No.: 259,751

[22] Filed: Oct. 19, 1988

[30] Foreign Application Priority Data

Oct. 22, 1987 [DE] Fed. Rep. of Germany ....... 3735669

[51] Int. Cl.$^4$ .......................... A01F 7/04; A01F 12/18
[52] U.S. Cl. ......................................... 460/14; 460/76; 460/77; 460/78
[58] Field of Search ........................ 460/14, 13, 59, 66, 460/69, 76, 77, 78, 81, 90, 85

[56] References Cited

U.S. PATENT DOCUMENTS

| | | | |
|---|---|---|---|
| 806,995 | 12/1905 | Robinson | 460/81 |
| 1,017,129 | 2/1912 | Boe | 460/90 |
| 2,875,768 | 3/1959 | Belkowski et al. | 460/14 |
| 4,062,366 | 12/1977 | De Coene | 460/14 |
| 4,273,138 | 6/1981 | Pauli | 460/66 X |
| 4,489,734 | 12/1984 | Van Overschelde | 460/81 |
| 4,628,946 | 12/1986 | De Busscher | 460/78 |
| 4,646,757 | 3/1987 | Schmitt | 460/90 X |

FOREIGN PATENT DOCUMENTS 941823 4/1956 Fed. Rep. of Germany ........ 460/69

Primary Examiner—Stephen J. Novosad
Attorney, Agent, or Firm—Michael J. Striker

[57] ABSTRACT

A harvester thresher comprises a chassis, a housing, a threshing and separating mechanism operating in accordance with the principle of a tangential flow and including a threshing drum and a threshing basket, a shaker located after the threshing mechanism as considered in direction of an agricultural product flow, and a threshing and separating device located after the shaker in the housing, operating in accordance with the principle of axial flow and including a rotor and a casing.

15 Claims, 3 Drawing Sheets

HARVESTER THRESHER

BACKGROUND OF THE INVENTION

The present invention relates to a harvester thresher. More particularly, it relates to a harvester thresher which has a chassis, a housing, a threshing and separating mechanism which operates in accordance with the principle of a tangential flow and has a threshing drum and a threshing basket, and a straw shaker located after the threshing mechanism and associated with downwardly arranged return bottom and sieve device.

Harvester threshers of the above mentioned general type are known in the art. It has been recognized that the travelling speed of such a machine during a harvesting is limited by increase of grain losses which exceed the normal value and are characterized by the fact that the shakers are no longer in a position to separate the residual grains remaining in the straw after passage of the threshing mechanism and to supply the same through the return bottom to the sieve device.

SUMMARY OF THE INVENTION

Accordingly, it is an object of the present invention to provide a harvester thresher of the above mentioned general type which permits to increase to a maximum the travelling speed and thereby the output in matching with respective agricultural conditions, without an unacceptable increase in grain losses.

In keeping with these objects and with others which will become apparent hereinafter, one feature of the present invention resides, briefly stated, in that the straw shaker of the harvester thresher in accordance with the present invention is followed by a threshing and separating device which operates in accordance with the principle of an axial flow and includes a rotor and a casing.

When the harvester thresher is designed in accordance with these features it achieves the above specified objects.

In accordance with another feature of the present invention, the threshing and separating device is selectively bringable in operation by providing a turnable segment in its casing, and an adjustable guiding flap.

Still another feature of the present invention is that the threshing and separating device exceeds the width of the housing and operates with a double flow by having a central product supply opening and two lateral product discharge openings.

The threshing and separating device can be arranged in a projection above the rear end of the return bottom.

In the region of the ends of the threshing and separating device which extend outwardly beyond the width of the housing, grain catching troughs and transporting screws can be arranged for lateral supply of the grains which pass through the openings of the casing, toward the return bottom.

A further feature of the present invention is that an introducing drum with a plurality of entraining members can be arranged above the ends of the threshing and separating device in the region of the product supply opening. Advantageously, it operates in accordance with an undershot principle.

The casing of the threshing and separating device can be provided on its inner side with guiding elements which lead to both product discharge openings.

The lateral product discharge openings can be associated with means for central asssembling of the straw which is discharged through the openings.

Finally, a chopper aggregate can be associated with each of two lateral product discharge openings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
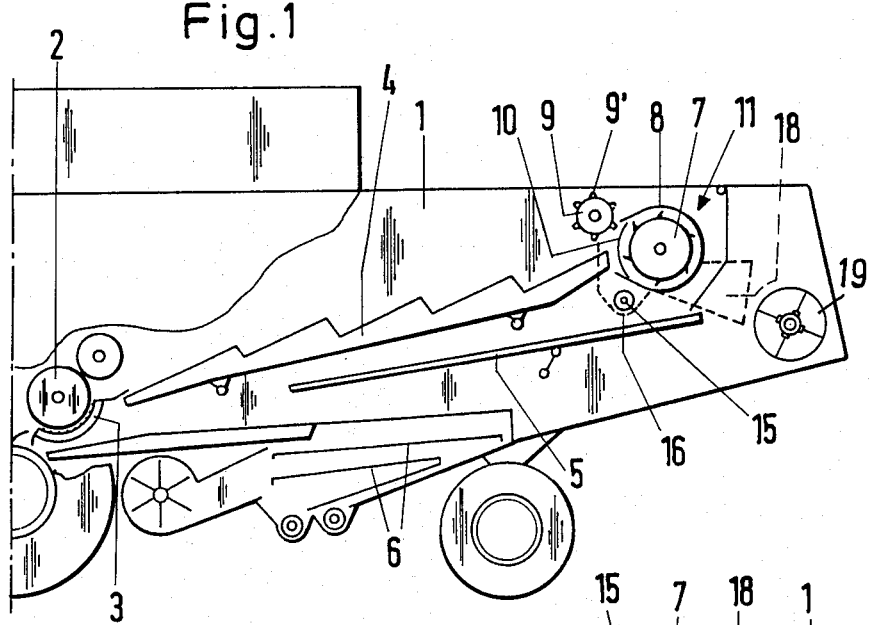
FIG. 1 is a schematic partial side view of a harvester thresher in accordance with the present invention.
Figure 2:
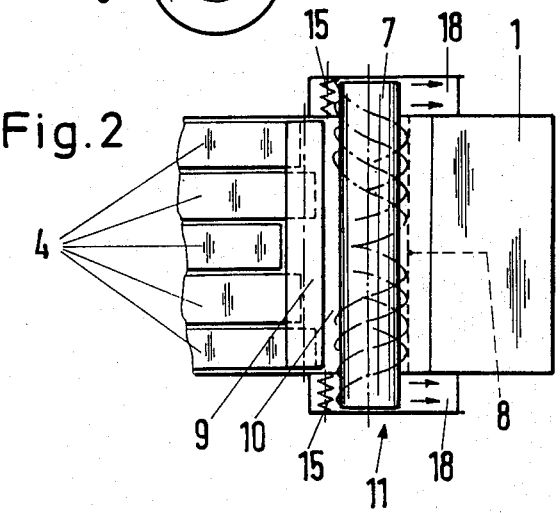
FIG. 2 is a schematic plan view of the harvester thresher of FIG. 1.
Figure 3:
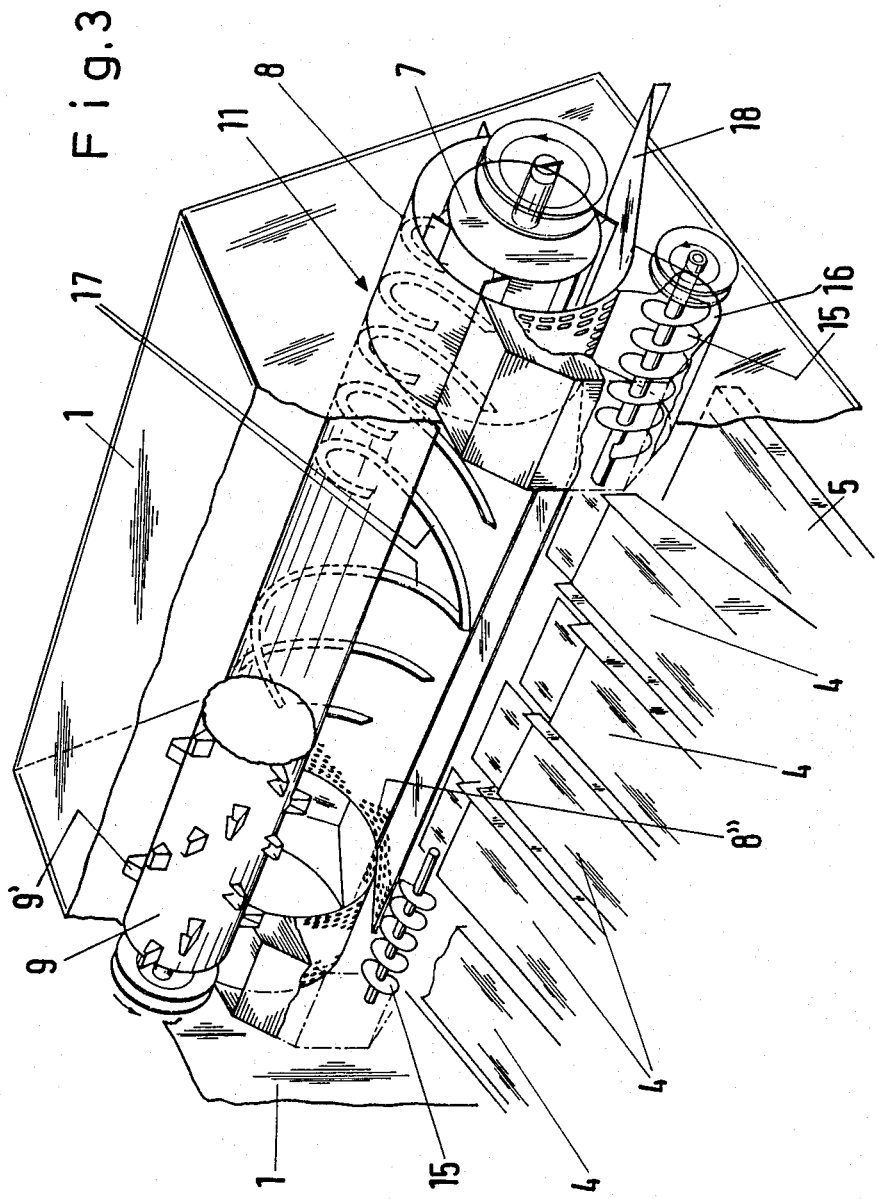
FIG. 3 is a perspective view of a rear part of the inventive harvester thresher.

A harvester thresher in accordance with the present invention has a housing which is identified as a whole with reference numeral 1. A threshing mechanism which includes a threshing drum 2 and a threshing basket 3 and operates in accordance with the principle of tangential flow is arranged in the housing 1. The housing 1 also accommodates straw shakers 4, a return bottom 5, and a sieve device 6 arranged after the threshing mechanism.

In accordance with the present invention, after the shakers 4, a threshing and separating device 11 composed of a rotor 7 and a casing 8 is arranged. An introducing drum 9 provided with an entraining element 9' is located above the ends of the straw shakers 4 before a product supply opening 10 of the axial threshing and separating device 11, in order to insure the transfer of the harvested product which comes from the shaker 4 and contains residual grains, to the device 11.

Figure 4:
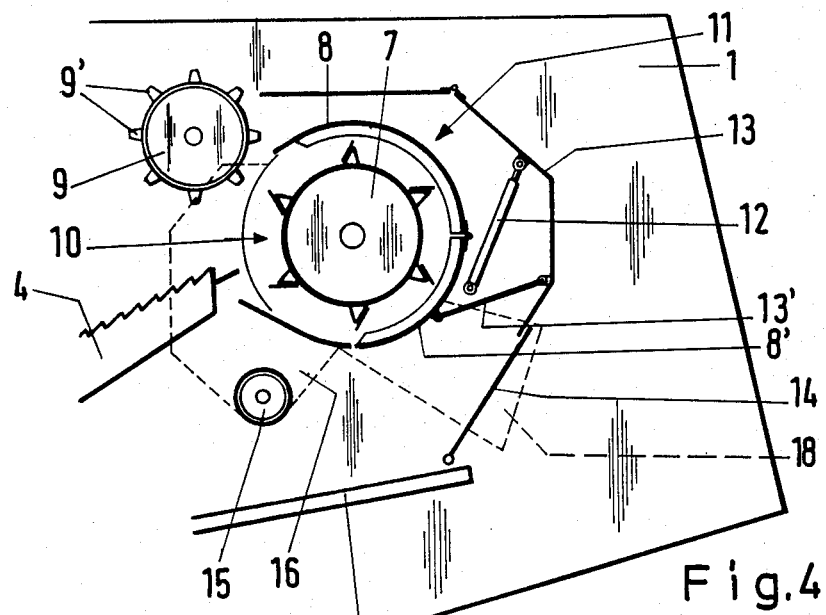
FIG. 4 is a schematic side view of an axial threshing and separating device arranged after a shaker, in an operative position.
Figure 5:
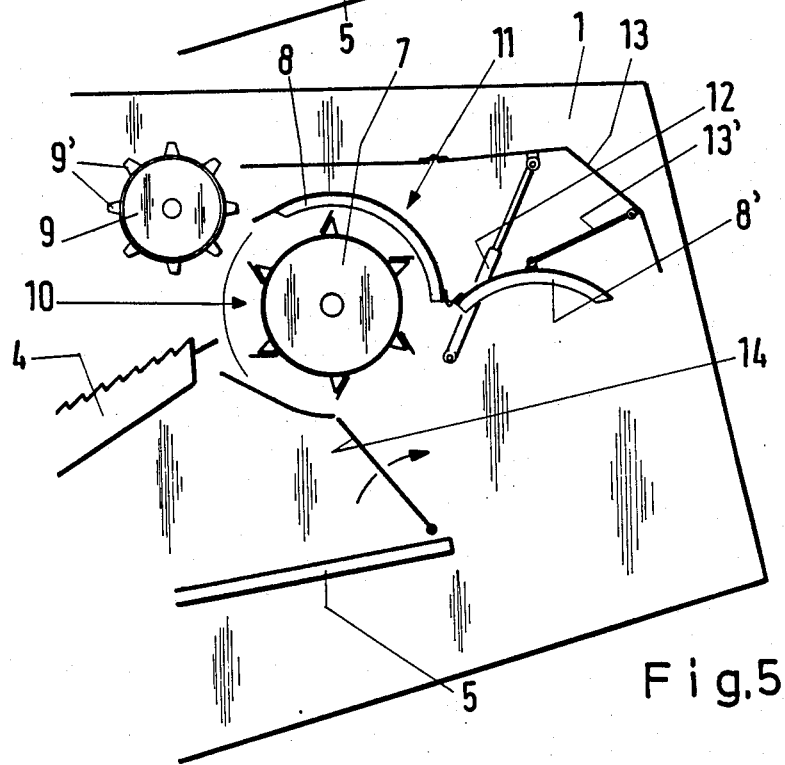
FIG. 5 is a view showing the axial threshing and separating device of FIG. 4 in a releasing position.

As illustrated in FIGS. 4 and 5, the device 11 can be brought into an operative position only when desired. For this purpose, the separating casing 8 has a segment 8' which can be turned out by a cylinder-piston unit 12 and a linkage including a hood flap part 13 and a lever pair 13'. For the same purpose a guiding flap 14 which is turnable by actuating means in a not shown manner is further provided. The flap 14 shields the return bottom 5 when the straw which comes from the shakers 4 flows without additional treatment through the device 11 out of the machine housing.

The grains which are threshed out in the axial threshing and separating device 11 flow through opening 8'' of the rotor casing 8 onto the return bottom 5. Then they are supplied either directly or by a transporting conveyors 15 and collecting troughs 16 which are arranged under the lateral ends of the device 11, which extend outwardly beyond the width of the housing 1.

As can be seen from the drawings, the device 11 in its projection is located above the return bottom 5. For this purpose the return bottom 5 must be in some cases extended, as opposed to known constructions. The agricultural product which comes from the shakers 4 is suppled centrally to the axial threshing and separating unit 11 through a product supply opening 10, and from there transported under the action of guiding elements 17 to the right and to the left in the inlet region of the rotor 7 and separating casing 8, and finally leave the unit 11 as threshed out straw through lateral product discharge openings 18.

A chopping aggregate 19 can be associated with each of the product discharge openings. Also, means can be provided for centrally directing the product discharged through the openings 18 located similarly to the chopping aggregate 19. These means can be formed as guiding plates.

It will be understood that each of the elements described above, or two or more together, may also find a useful application in other types of constructions differing from the types described above.

While the invention has been illustrated and described as embodied in a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A harvester thresher, comprising a chassis; a housing; a threshing and separating mechanism operating in accordance with the principle of a tangential flow and including a threshing drum and a threshing basket; a shaker located after said threshing mechanism as considered in direction of an agricultural product flow; and a threshing and separating device located after said shaker in said housing, operating in accordance with the principle of axial flow and including a rotor and a casing.

2. A harvester thresher as defined in claim 1; and further comprising a return bottom and a sieve device arranged under said threshing and separating device.

3. A harvester thresher as defined in claim 1, wherein said threshing and separating device is selectively actuatable when desired; and further comprising means for selectively actuating said threshing and separating device.

4. A harvester thresher as defined in claim 3, wherein said means for selectively activating includes a turnable segment provided in said casing and an adjustable product guiding flap.

5. A harvester thresher as defined in claim 1, wherein said housing has a predetermined width, said threshing and separating device having a length which extends the width of the housing.

6. A harvester thresher as defined in claim 1, wherein said threshing and separating device is formed as a double-flow operating device and provided with a central product supply opening and two lateral product discharge openings.

7. A harvester thresher as defined in claim 2, wherein said return bottom has a rear end, said threshing and separating device in its projection being arranged above said rear end of said return bottom.

8. A harvester thresher as defined in claim 1, wherein said housing has a predetermined width, said threshing and separating device having lateral ends which extend outwardly beyond said width of said housing; and further comprising grain catching troughs and transporting screws located under said lateral ends of said threshing and separating device and arranged for lateral supply of grains coming from said threshing and separating device to said return bottom.

9. A harvester thresher as defined in claim 8, wherein said casing of said threshing and separating device has outlet openings, said grain catching troughs and transporting screws being located in the region of said outlet openings.

10. A harvester thresher as defined in claim 1, wherein said shaker has an end, said threshing and separating device having a product supply opening; and further comprising an introducing drum arranged above said end of said shaker in the region before said product supply opening of said threshing and separating device.

11. A harvester thresher as defined in claim 10, wherein said introducing drum is provided with a plurality of entraining elements and operates in an undershot manner.

12. A harvester thresher as defined in claim 1, wherein said threshing and separating device has two lateral product discharge openings, said casing of said threshing and separating device being provided on its inner side with guiding elements which lead to said product discharge openings.

13. A harvester thresher as defined in claim 1, wherein said threshing and separating device has two lateral product discharge openings; and further comprising means for centrally assembling a straw which is discharged through said product discharge openings.

14. A harvester thresher as defined in claim 13, wherein said centrally assembling means are formed as guiding plates.

15. A harvester thresher as defined in claim 1, wherein said threshing and separating device has two lateral openings; and further comprising a chopping aggregae associated with each of said product discharge openings.

* * * * *